(12) United States Patent
Sundaram et al.

(10) Patent No.: US 6,875,414 B2
(45) Date of Patent: Apr. 5, 2005

(54) POLYSULFIDE MEASUREMENT METHODS USING COLORMETRIC TECHNIQUES

(75) Inventors: V. S. Meenakshi Sundaram, Burr Ridge, IL (US); Daniel Duarte, Clarendon Hills, IL (US); Malik Haouchine, Chicago, IL (US)

(73) Assignees: American Air Liquide, Inc., Fremont, CA (US); L'Air Liquide - Societe Anonyme a'Directoire et Conseil de Suveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 10/104,760

(22) Filed: Mar. 22, 2002

(65) Prior Publication Data

US 2003/0157017 A1 Aug. 21, 2003

Related U.S. Application Data

(60) Provisional application No. 60/348,663, filed on Jan. 14, 2002.

(51) Int. Cl.$^7$ .......................... C01B 17/24; C01B 17/34
(52) U.S. Cl. .................. 423/562; 162/30.11; 423/566.2
(58) Field of Search ............... 162/29, 30.11, 162/51, 70; 422/82.05; 423/526, 562, 561.1, 566.2

(56) References Cited

U.S. PATENT DOCUMENTS

| | | |
|---|---|---|
| 3,470,061 A | 9/1969 | Barker .................. 162/32 |
| 3,890,428 A | 6/1975 | Jayawant .................. 423/264 |
| 4,024,229 A | 5/1977 | Smith et al. |

(Continued)

FOREIGN PATENT DOCUMENTS

| | | |
|---|---|---|
| AT | 212687 | 12/1960 |
| EP | 0514901 A | 11/1992 |
| WO | WO8404552 A | 11/1984 |
| WO | WO8404597 A | 11/1984 |

OTHER PUBLICATIONS

Casey, James P., Pulp and Paper Chemistry and Chemical Technology, 3$^{rd}$ Edition, p. 432, vol. 1, Wiley–Interscience Publication, John Wiley & Sons.

Watanabe, Keigo et al., "New Process of Producing Highly Concentrated Polysulfide Liquor by Electrolysis of White Liquor", TAPPI 1999 Pulping Conference, vol. 1, pp. 397–405.

Lewis, Richard J., Hawley's Condensed Chemical Dictionary, 12$^{th}$ Edition, p. 941, Van Nostrand Reinhold, an International Thomson Publishing Company 1993.

Ruelle, Nathalie et al, "Cathodoluminescent Properties and Energy Transfer in Red Calcium Sulfide Phosphors", J. Appl. Phys., Sep. 1992, vol. 31, Part 1, No. 9A, pp. 2786–2790.

Vasilyeva, I.G. et al, "Color and Chemical Heterogeneities of y-[Na]–Ce2S3 Solid Solutions", Journal of Alloys and Compounds, 1998, vol. 268, p. 72–77.

(Continued)

*Primary Examiner*—Wayne A. Langel
(74) *Attorney, Agent, or Firm*—Christopher J. Cronin; Linda K. Russell (57) ABSTRACT

Methods of converting a sulfide in a composition to polysulfide are described, one method comprising the steps of exposing the composition to conditions and for a time sufficient to cause conversion of at least a portion of the sulfide, to polysulfide to form a modified composition; and controlling the conversion to polysulfide by measuring a color parameter of the modified composition.

28 Claims, 4 Drawing Sheets

Delta*E vs.Polysufide Concentration (g/L)

U.S. PATENT DOCUMENTS

| | | | | |
|---|---|---|---|---|
| 4,147,612 | A | * | 4/1979 | Miasek et al. ............... 208/108 |
| 4,740,473 | A | * | 4/1988 | Tomlin ......................... 436/79 |
| 4,800,279 | A | | 1/1989 | Hieftje et al. ................ 250/339 |
| 5,075,098 | A | | 12/1991 | Bittner et al. ............ 423/566.2 |
| 5,082,526 | A | | 1/1992 | Dorris ..................... 162/30.11 |
| 5,121,337 | A | | 6/1992 | Brown ........................ 364/498 |
| 5,215,865 | A | | 6/1993 | Chen .......................... 430/293 |
| 5,446,681 | A | | 8/1995 | Gethner et al. ............. 364/554 |
| 5,500,085 | A | | 3/1996 | Magnotta et al. |
| 5,616,214 | A | | 4/1997 | Leclerc ........................ 162/49 |
| 5,624,545 | A | | 4/1997 | Landfors et al. ............ 205/746 |
| 5,755,925 | A | | 5/1998 | Michel et al. |
| 6,279,733 | B2 | | 8/2001 | Eltvedt ....................... 198/816 |
| 6,337,062 | B1 | * | 1/2002 | Akiba ..................... 423/566.2 |

OTHER PUBLICATIONS

Teder, Ants, "Spectrophotometric Determination of Polysulfide Excess Sulfur in Aqueous Solutions", Svensk Papperstidning, No. 6, 31 Mars 1967.

Green, Robert P., "Introduction and Principals of Chemical Recovery", Chemical Recovery in the Alkaline Pulping Processes, 1992, p. 3, $3^{rd}$ Edition, TAPPI Press.

Teder, Ants., "The Spectra of green Sulfide and Polysulfide Solutions", Svensk Papperstidning No. 11, 15 Juni 1968.

Kirk Othmer Encyclopedia of Chemical Technology, pp. 841–876, vol. 6, $4^{th}$ Edition, Wiley–Interscience Publication, John Wiley & Sons.

"The Determination of Instrumental Color Differences", Pulping and Paper Production, 97/98 Technical Information Papers, pp. 858–866, TIP 0804–04, TAPPI Press.

* cited by examiner

POLYSULFIDE MEASUREMENT METHODS USING COLORMETRIC TECHNIQUES

CROSS REFERENCE TO RELATED APPLICATIONS

The present application is related to and claims priority from provisional application Ser. No. 60/348,663, filed Jan. 14, 2002, which is hereby incorporated by reference.

BACKGROUND OF THE INVENTION

1. Field of the Invention

The present invention relates to polysulfide measurement methods, more particularly to polysulfide measurement when polysulfides are produced or consumed in processes. Polysulfides are produced in white liquor used in paper production, and consumed in other processes.

2. Related Art

Polysulfide is a sulfur compound used in various industries for various purposes. For example, in the pulp and paper industry, it is a very well established fact that the use of polysulfide during the cooking process increases the pulp yield (based on wood). It is beneficial to the pulp industry since they can produce more pulp from a given ton of wood (or) reduce the usage of wood for given ton of pulp. One method of producing polysulfide is to oxidize white liquor, which contains sodium sulfide, with oxygen. Since polysulfide is an intermediate compound, the reaction must be well controlled; or else, the oxidized white liquor will contain unacceptable quantities of thiosulfate, sulfite and sulfate. Until today the challenge is having a simple method to measure the concentration of polysulfide especially on an industrial scale. All current available methods to measure the concentration of polysulfide are analytical methods and are therefore difficult to integrate to an industrial process.

Polysulfide can be generated by different means based on industry and type of use. In the pulp and paper industry, adding elemental sulfur to the white liquor can form polysulfides. See for example, Casey, J. P., "Pulp and Paper Chemistry and Chemical Technology", Third Edition, Volume I, Wiley-Interscience Publication, p 432. However, adding elemental sulfur to the white liquor leads to imbalances in the sulfur balance of the chemical recovery cycle. The build-up of sulfur will eventually be eliminated to the atmosphere as sulfur gas emission. The second approach consists of chemically oxidizing the sodium sulfide present in the white liquor to sodium polysulfide using $MnO_2$ as a catalyst. The resulting liquor is known in the art as orange liquor. The methods involve several chemical species. One goal sought during the oxidizing process is to selectively generate polysulfide and minimize the formation of dead load, more specifically thiosulfate.

Several variations of the oxidative methods have been published. U.S. Pat. No. 3,470,061, Barker discloses using an inorganic manganese oxide as the oxidant. In U.S. Pat. No. 4,024,229, Smith discloses a method to generate polysulfide by chemical oxidation using particulate carbon, coated with PTFE, as the catalyst. The method is said to reduce production of thiosulfate. In U.S. Pat. No. 5,082,526, Dorris discloses a method to produce polysulfide in the presence of lime mud. In U.S. Pat. No. 5,624,545 Landfors et al, discloses a method to produce polysulfide by electrolysis of the white liquor.

Polysulfide can also be generated electrochemically. See, for example, Watanabe, K., et al., "New Process of Producing Highly Concentrated Polysulfide Liquor by Electrolysis of White Liquor", TAPPI 1999 Pulping Conference Proceedings, Volume 1.

Polysulfide is used for various other purposes in addition to its use in increasing pulp yield in pulp and paper mills. One other use of polysulfide is in the preparation of sealants. Polysulfide is considered to be thermoset sealant. Evode Ltd. discusses an example of a monopoly polysulfide sealant in product data sheet, and markets the sealant under the trade designation "MONOPOL". The data sheet reports that sealants prepared using monopol polysulfide provide more movement accommodation than competitive polysulfides, and forms a tough compound with good adhesion and color retention on reaction with atmospheric moisture.

U.S. Pat. No. 5,075,098 discusses the preparation of sodium monosulfide by means of reacting a sodium polysulfide with sodium under protective gas. U.S. Pat. No. 5,215,865 discusses an image development method and the preferred developer is an aqueous solution of sodium sulfide and ammonium polysulfide. U.S. Pat. No. 6,279,733 discusses an invention related to a tire having a sidewall component comprising an EPDM-based rubber composition prepared with specified precipitated silica reinforcement and an organosilane disulfide material. A liquid organosilane polysulfide comprising bis-(3-ethoxysilylpropyl) polysulfide is discussed.

Polysulfide can be associated with alkaline, alkaline earth and transition metals. U.S. Pat. No. 3,890,428 discusses the removal of coloring agents such as polysulfide in the manufacture of ammonium thiosulfate solutions using aqueous sodium, lithium or potassium silicates. Nathalie et al., J. Appl. Phys., Part 1, Rgul Pap, short Note, vol. 31, n 9A, September 1992, p 2786–2790, discuss the use of a potassium polysulfide flux to prepare efficient phosphors. It was also shown by Vasilyeva et al., Journal of Alloys and Compounds, vol. 268, n 1-2, Mar. 27, 1998, p 72–77, that heterogeneity such as sodium or cerium polysulfides in small amounts can be the cause of a significant modification of color in gamma-[Na]—$Ce_2S_3$ solid solutions.

Polysulfide elastomers are known, which are synthetic polymers in either solid or liquid form obtained by the reaction of sodium polysulfide with organic dichlorides such as dichlorodiethyl formal, alone or mixed with ethylene dichloride. Polysulfide elastomers are said to be outstanding for resistance to oils and solvents and for impermeability to gases. Hawley's Condensed Chemical Dictionary, Twelfth Ed., page 941 (1993).

Since human vision reduces many wavelength bands in a light spectrum into a three-dimensional signal in the retina, color is conventionally expressed as calorimetric quantities having three values. A common colorimetric system is the CIE L*a*b*. The term CIE corresponds to the International Commission on Illumination (abbreviated CIE from the French expression). In this color system +a* corresponds to red, −a* to green, +b* to yellow, and −b* to blue. The L* values correspond to the lightness scale. Customarily, a numerical expression of such a color difference is used to determine acceptability of manufactured items. With the CIE L*a*b* colorimetric system, numerical expressions to express color differences exist.

Methods exist for the estimation of composition and other properties from all types of spectral measurements, (e.g., reflectance and transmittance spectral measurements) by reference to sets of calibration data measured on samples (including liquids) of known properties. For example, U.S. Pat. No. 4,800,279, discloses a method using infrared absorbance spectra of calibration samples of known physical properties to determine those infrared wavelengths at which the absorbance correlates with a physical property to be quantified, and then estimate that property for a sample from its infrared absorbance spectrum. U.S. Pat. No. 5,121,337 and U.S. Pat. No. 5,446,681 discloses methods for estimating unmeasured properties, such as composition, from spectral measurements on samples, using advanced statistical procedures and rule-based criteria to correlate spectral measurements and measurements of the desired property (or composition) for a set of calibration samples. In the case of patent U.S. Pat. No. 5,121,337 the emphasis is placed on correcting spectral data due to the measurement process itself; whereas U.S. Pat. No. 5,446,681 is geared towards the on-line spectrometry aspect.

The main difference between the previously mentioned patents, and our invention, is that they do not operate in the visible light spectrum. They all use infrared. Another important distinction, and this corresponds to U.S. Pat. No. 5,121,337 and U.S. Pat. No. 5,446,681, is that they require complex statistical methods for data analyses. The methods described in this invention disclosure, to detect variations in polysulfide concentration, is based on color difference indicators.

Another patent of interest is U.S. Pat. No. 5,616,214. In this patent, a direct monitoring and control method is provided for on-line measurement of effective alkali, carbonate, sulfate and thiosulfate concentrations in process liquors for the production of kraft pulp. However, unlike our invention, the device/strategy does not monitor polysulfide concentration, and, as in the previous examples, the apparatus operates at infrared.

The inventors believe that the relation between the $L^*a^*b^*$ values and polysulfide concentration can be affected by the chemical and physical properties of the composition being tested (for example, hydroxyl ion concentration, temperature, impurities, and the like), as noted in the discussion of Related Art. For example, it is known that white liquor is a solution of Sodium Hydroxide and Sodium Sulfide (which are the two main pulping components). The concentration of these compounds can vary depending on the mill and the type of product desired. Many industrial liquors contain compounds that are useless and commonly referred as dead load. Examples of dead load are $Na_2CO_3$, $Na_2S_2O_3$, $Na_2SO_3$, and Na2SO4. These industrial liquors also contain impurities in small amount such as Magnesium, Potassium, Phosphorus, Silicon, Iron, Aluminum, Barium. Therefore a calibration is specific to a certain situation, mill, or process. This observation is based on the experience of the inventors and literature. For example, Ants Teder, "Spectrophotometric Determination of Polysulfide Excess Sulfur in Aqueous Solutions", Svensk Papperstidning, No. 6, 31 mars 1967, has documented the possible effect of hydroxyl ions concentration: "Only a few spectrophotometric studies of aqueous polysulfide solutions have been reported. They are of rather small scope, being minor parts of investigations using mainly other methods, and are limited to wavelengths longer than 295 nm. Great difficulties in reproducing the spectra have been reported. These problems can be overcome by handling the samples under careful exclusion of air, control of hydroxyl ions concentration and by avoiding too small polysulfide concentrations." Also, it is well known that, when the mixture of molten sodium sulfide and sodium carbonate produced by a recovery furnace is dissolved in water, a green solution, called "green liquor", is obtained. This green color has been ascribed to iron impurities. Green R. P., et al., "Chemical Recovery in the Alkaline Pulping Process", Third Edition, TAPPI PRESS, Atlanta, Ga., p. 3.

The spectra of solutions (containing sulfide and polysulfide) are affected by temperature. Teder, Ants, "The Spectra of Green Sulfide and Polysulfide Solutions", Svensk Papperstidning, No. 11, 15 Juni 1968.

The currently available methods to measure polysulfide concentrations are all analytical. The methods are time consuming and, depending upon the method, expensive analytical tools are necessary. These laboratory oriented methods cannot be implemented to measure and control large industrial processes.

SUMMARY OF THE INVENTION

In accordance with the present invention, colorimetric methods are employed to monitor, and preferably control, polysulfide generated in compositions, for example, from the oxidation of sodium sulfide in pulp white liquor compositions. The method of generating polysulfide is preferably selected from the group consisting of oxidation (either catalyzed or non-catalyzed), application of electromagnetic radiation, or combinations thereof. The reaction is monitored so that it proceeds toward, but does not reach, completeness, which would result in complete conversion to sodium sulfate if the process is not well controlled. It has been determined by the inventors herein that compositions comprising various concentration of polysulfide have corresponding variation in color. For example, it has been discovered that compositions comprising partially oxidized white liquor and polysulfide have a yellowish-green color compared to its initial form (white liquor) and its completely oxidized form (thiosulfate and sodium sulfate), which are both colorless solutions. Color variation of these compositions is taken advantage of in the present invention. Compared with currently available analytical methods to measure polysulfide concentrations, the methods of the invention are not time consuming and are inexpensive. Significantly, the inventive methods can be implemented in retrofit or new polysulfide production processes, preferably integrated therewith to measure and control large industrial processes. The present invention should not be limited to use in preferred polysulfide processes. For example there are many different types of processes that either generate polysulfide, or use polysulfide to produce another composition. All of the processes could benefit from the use of color to monitor and control the production of polysulfide or its consumption.

A first aspect of the invention is a method of converting a sulfide in a composition to polysulfide, the method comprising the steps of:

a) exposing the composition to conditions sufficient to convert at least some of the sulfide, thus forming a modified composition, and maintaining the conditions for a time sufficient to cause conversion of a portion of the sulfide to polysulfide in the modified composition; and b) controlling the conversion to polysulfide by measuring a color parameter of the modified composition.

Preferably the sulfide is sodium sulfide, and the polysulfide is sodium polysulfide.

A second aspect of the invention is a method of combining an oxygen-containing fluid with a composition comprising a sulfide during production of polysulfide, the method comprising the steps of:

a) combining the composition with the oxygen-containing fluid under conditions sufficient for oxygen in the oxygen-containing fluid to contact at least some of the sulfide, thus forming a modified composition, and maintaining the contact for a time sufficient to cause conversion of a portion of the sulfide to polysulfide in the modified composition; and b) controlling the combining of the composition with the oxygen-containing fluid by measuring a color parameter of the modified composition.

Preferred methods in accordance with this aspect of the invention are methods wherein the sulfide is sodium sulfide, the polysulfide is sodium polysulfide, and the controlling is selected from the group consisting of controlling a flow of the composition, controlling a flow of the oxygen-containing fluid, controlling temperature of the composition, controlling mixing of the composition, and combinations thereof. Other preferred methods are those wherein the color parameter is selected from the group consisting of $\Delta E^*$, $\Delta C^*$, $\Delta(ab)^*$, and other parameters derived from CIEE $L^*a^*b^*$ measurements, as further explained herein. Methods wherein the fluid comprising oxygen is selected from the group consisting of air, oxygen-enriched air, and oxygen are preferred. As used herein the term "oxygen" is selected from pure oxygen and industrially pure oxygen, such as obtained from cryogenic, membrane, and adsorption processes known in the air separation art. Yet other preferred methods are those wherein the combining comprises adding the fluid comprising oxygen to the composition. Other preferred methods are those wherein the conditions sufficient for oxygen in the oxygen-containing fluid to contact at least some of the sodium sulfide comprises combining the composition with the oxygen-containing fluid in a container (also termed a reactor herein), and especially methods wherein the composition is subjected to high shear in the container. Depending on the industry and also depending on the conditions one wants to use for the reactor, it may be preferable or not to use an inert gas in addition to the oxygen-containing gas. For example, in our case, we know that the optimum condition (as far as selectivity of polysulfide conversion is concerned) for our reactor is to have an oxygen concentration around 50 percent. In the lab-scale reactor, operating with an atmospheric pressure and a temperature of 80° C., feeding 100 percent oxygen corresponds to having an oxygen concentration of about 60 percent in the vessel because of the water vapor produced in the reactor. In order to lower that concentration, one method is to introduce a certain amount of inert gas in the reactor. It may also be preferable to keep a higher oxygen concentration in order to have a shorter retention time.

Preferred methods of this aspect of the invention are those wherein the conversion of the portion of the sulfide to the polysulfide is carried out for a time sufficient to produce a selectivity of at least 50 percent, more preferably at least 90 percent, and methods wherein the conversion of the portion of the sulfide to the polysulfide is carried out for a time sufficient to produce a yield which is appropriate for the situation.

Measuring a color parameter of the modified composition preferably comprises taking samples of the modified composition at various times, optionally filtering the composition when necessary, and measuring one or more color parameters with a color parameter measuring instrument, thus creating a data set of time versus color parameter for a given reaction conditions.

In the case of use of oxygen to oxidize sulfide to polysulfide, the data set would preferably comprise mixing rate, oxygen-containing fluid flow rate, oxygen partial pressure, temperature, and total pressure. Preferably, the conditions sufficient for oxygen in the oxygen-containing fluid to contact at least some of the sulfide comprises a temperature ranging from about 0° C. to about 200° C., more preferably ranging from about 60° C. to about 100° C., an oxygen concentration in the reactor ranging from 0 percent to 100 percent, more preferably ranging from about 30 percent up to about 70 percent, a total pressure from 0 psig to about 100 psig, more preferably ranging from about 1 psig to about 20 psig. Total pressure may be less than or more than atmospheric pressure, but is preferably slightly above atmospheric pressure. Mixing is preferably performed using a high shear mixer, as discussed herein.

White liquor from paper pulping is a clear, colorless solution, and when white liquor is completely oxidized (i.e., sodium sulfide is fully oxidized to thiosulfate and sodium sulfate) that solution is also clear and colorless. However, partially oxidized white liquor samples containing polysulfide have a yellow-green color. Use of color to measure, monitor and/or control polysulfide concentration and/or generation is new and considered as inventive. Currently there are no colorimetric measurement or control measures available for an industrial polysulfide production process.

A third aspect of the invention is a method of controlling the conversion of sodium sulfide to sodium polysulfide in a white liquor oxidation process, the method comprising:

a) combining white liquor with a fluid comprising oxygen under conditions sufficient for oxygen in the fluid to contact at least some sodium sulfide in the white liquor, thus forming a partially oxidized white liquor, and maintaining the contact for a time sufficient to cause conversion of a portion of the sodium sulfide, but not all of the sodium sulfide, to sodium polysulfide in the partially oxidized white liquor; and b) controlling the combining of the white liquor with the oxygen-containing fluid by measuring a color parameter of the partially oxidized white liquor and controlling the conversion to sodium polysulfide versus thiosulfate produced by controlling one or more parameters selected form the group consisting of temperature, flow rate of white liquor, flow rate of fluid comprising oxygen, concentration of oxygen in a container where said contact is taking place, mixing speed, catalysts concentration, and combinations thereof, during the contact.

A fourth aspect of the invention is a method of converting a polysulfide in a composition to sulfide, the method comprising the steps of:

a) exposing the composition to conditions and for a time sufficient to cause conversion of at least a portion of the polysulfide to sulfide, thus forming a modified composition; and b) controlling the conversion to sulfide by measuring a color parameter of the modified composition.

Preferred methods includes those wherein the exposing step is selected from the group consisting of mixing of said composition, temperature change of the composition, and combinations thereof. Other preferred methods are those wherein the measuring a color parameter of the modified composition comprises taking samples of the modified composition at various times, measuring the color parameter with a color parameter measuring instrument, and creating a data set of time versus color for the conditions.

One advantage of the inventive methods is that polysulfide can be measured colorimetrically even in the presence of other species, for example, sodium ions, calcium ions, and the like. Further aspects and advantages will become readily apparent to skilled artisans upon reading the following description, which is illustrative only, and not intended to limit in any way the inventive conceptions.

DESCRIPTION OF PREFERRED EMBODIMENTS

While the much of the discussion of preferred embodiments focuses on conversion of sulfide to polysulfide, particularly in the pulp and paper industry, it will be recognized by those of ordinary skill in the various arts where polysulfides are produced or consumed that the methods of the invention are equally useful in those arts, with appropriate modifications for each particular situation. For example, liquid and solid samples may need to be physically and/or chemically modified in order to measure their color, such as dissolved in appropriate solvents, melted, crushed, screened, filtered, neutralized, and the like.

As stated herein previously, in the pulp and paper industry, it is an established fact that the use of polysulfide during the cooking process increases the pulp yield (based on wood). It is beneficial to the pulp industry since they can produce more pulp from a given ton of wood (or) reduce the usage of wood for given ton of pulp. One method of producing polysulfide is to oxidize white liquor, which contains sodium sulfide, with oxygen. Since polysulfide is an intermediate compound, the reaction must be controlled, or else the oxidized white liquor will contain unacceptable quantities of thiosulfate, sulfite and sulfate. The methods of the present invention allow measurement of concentration of polysulfide quickly and inexpensively, whether in a laboratory setting or a commercial plant, which is especially important in an industrial scale polysulfide production process. The inventors herein first employed a lab-scale apparatus and process, which is now described. The lab-scale apparatus is more fully described in assignee's co-pending U.S. application Ser. No. 09/784,076, filed Feb. 16, 2001, abandoned, incorporated herein by reference in its entirety for its teaching of a lab-scale polysulfide reactor apparatus.

Methods of Polysulfide Generation in the Laboratory

Laboratory scale polysulfide generation was conducted, using analytical methods to quantify polysulfide concentration, and methods for color parameter determination and correlation with standard analytical measurements. We then detail a preferred method to integrate colorimetry in an industrial polysulfide generation process to measure and control polysulfide.

A) Reactor Setup

Figure 1:
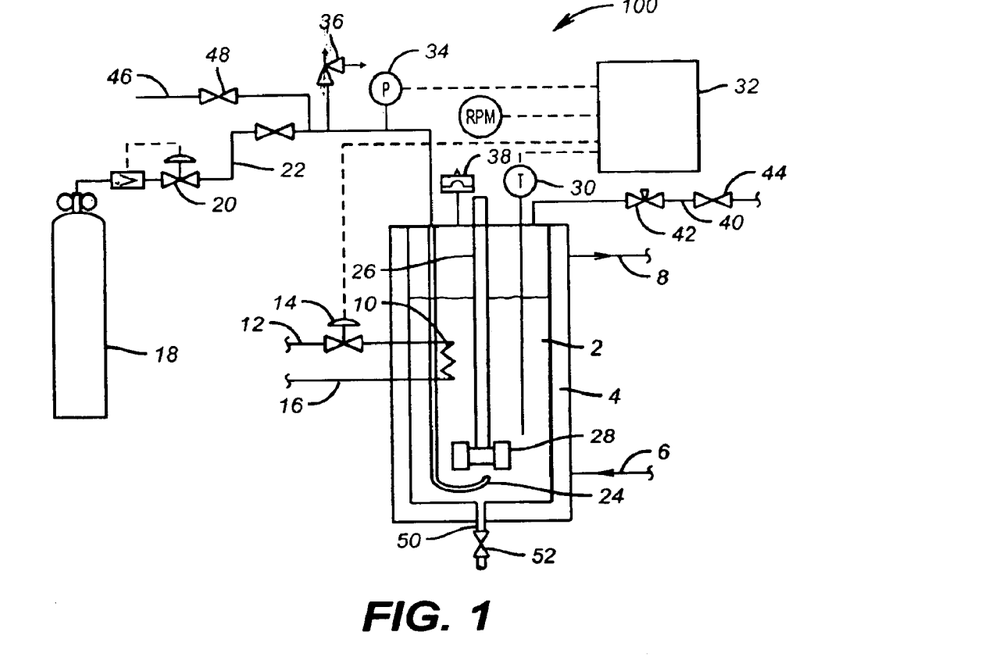
FIG. 1 is a preferred reactor for production of polysulfide in accordance with the present invention.

FIG. 1 illustrates a preferred reactor and control scheme apparatus 100. Although other experimental arrangements are possible, our lab-scale experiments were performed using apparatus 100 which included a 2-liter glass container 2 equipped with a heating jacket 4 which allowed heated water to circulate around the exterior of container 2. Heating water was supplied by a conduit 6 exited through a conduit 8. Cooling coils 10 were used, along with heating jacket 4, to maintain the desired temperature of the white liquor, which ranged from about 60° C. to about 100° C., more preferably from about 75° C. to about 85° C. Water was used as the cooling medium, provided through conduit 12 and control valve 14, and exited through conduit 16. Oxygen was delivered to container 2 from a house oxygen source, here designated simply as a cylinder, 18, through a mass flow controller 20, conduit 22, and an open tube 24 immersed in the white liquor. Mass flow controller 20 controlled the flow rate of oxygen at a flow rate ranging from 0 to about 2000 standard cubic centimeters/minute (sccm). Gas/solid/liquid mixing was performed using a hollow shaft 26 and impeller 28, which allowed oxygen gas recirculation. A thermocouple 30 was used to measure temperature of the contents of container 2. Partial pressure of oxygen was controlled using a pressure measuring device 34. The temperature, flow rate of cooling water, rpm of hollow shaft 26 and impeller 28, and partial pressure of oxygen was were monitored and controlled via a control panel 32. A pressure relief valve 36 was employed as a safety measure, as well as a rupture disk 38. A purge conduit 40, needle valve 42, and block valve 44 were used to pull a vacuum at the beginning of the experiments, and to control system total pressure by purging some of the oxygen and inert gas in the reactor when needed. Nitrogen for purging and blanketing was provided via a conduit 46 and valve 48. A sample conduit 50 and valve 52 are also provided.

B) Preparation and Experiments

For each experiment container 2 of reactor 100 was initially filled with 1 liter of unclarified white liquor along with the desired concentration of manganese dioxide, which ranged from 0 to about 10 grams/liter (g/L). Container 2 was then sealed and purged with nitrogen for a period of 15 minutes at a mixing speed of 1000 rpm. After this time, the nitrogen pressure was increased to 10 psig and the liquor was heated to 80° C. When the desired temperature of 80° C. was reached an 8 to 10 mL liquor sample was withdrawn from the reactor. This sample was used as the time=0. The mixing speed was then increased to the desired rpm, preferably above 1000 rpm, preferably about 1500 rpm, and oxygen was introduced in container 2. During each experiment, enough samples were collected (usually 7 to 8) to produce a polysulfide concentration vs. time curve. In order to prevent the degradation of the samples, they were sparged with nitrogen and immediately quenched in an ice bath before being analyzed by analytical and colorimetric methods as described below.

Methods of Polysulfide Measurement Using Analytical Methods

Various polysulfide analytical methods are available: gravimetry, chromatography, potentiometric titration and capillary electrophoresis. First, this section presents an overview of the nomenclature used in polysulfide pulping. Then polysulfide analysis by gravimetry, a commonly used method, and by capillary electrophoresis (CE), are discussed.

A) Nomenclature

Sulfide sulfur (sulfur in formal oxidation state-II) and polysulfide excess sulfur (sulfur in formal oxidation state 0) are defined as:

$$[S(-II)]=[HS^-]+[S^{2-}]+\Sigma[S_nS^{2-}] \qquad \text{Equation 1}$$

$$[S(0)]=\Sigma n[S_nS^{2-}] \qquad \text{Equation 2}$$

Polysulfide ions are usually conveniently considered as one atom of sulfide sulfur and one atom of polysulfide excess sulfur even though sulfur in polysulfide ions is interchangeable. The ratio of polysulfide excess sulfur to sulfide sulfur is the stoichiometric composition ($X_S$) while the average number of excess sulfur atoms per polysulfide ion (n bar) is given by:

$$\bar{n} = \frac{\Sigma n[S_n S^{2-}]}{\Sigma[S_n S^{2-}]} \quad \text{Equation 3}$$

The variable B, which governs the relative amounts of the different polysulfide ions, is defined as:

$$B=[HS^-][OH^-]/[S(0)] \quad \text{Equation 4}$$

Polysulfide yield (Y) and selectivity (SEL) are used to quantify the efficiency of oxidation processes to produce polysulfide rather than thiosulfate from sulfide:

$$Y = \frac{\text{polysulfides formed}}{\text{initial sulfide}} \times 100 \quad \text{Equation 5}$$

$$SEL = \frac{\text{polysulfide formed}}{\text{converted sulfide}} \times 100 \quad \text{Equation 6}$$

Preferably, selectivity is at least 50 percent, while yield is whatever is appropriate for the given pulp mill, since residual sulfide is required for pulping.

B) Gravimetry

The determination of polysulfide by gravimetry consists of the acidification of the filtered oxidized liquor sample in order to precipitate the elemental sulfur (polysulfide excess sulfur). The sample is first diluted with water and acidified in the presence of EDTA. The resulting milky solution is then filtered under vacuum. Finally, the polysulfide precipitate is dried and weighed.

C) Capillary Electrophoresis

Capillary electrophoresis is used to separate charged compounds. The selectivity of the method is based on the differences in ion mobility in an electrical field. The separation takes place in a capillary filled with a buffer when a difference of voltage is applied to the capillary. The ions are detected at the end of the capillary. Direct detection is when the analyte absorbs more than the electrolyte co-ion (buffer); this leads to a positive signal. Indirect detection is the opposite case and gives a negative signal. The calibration curve is performed with a solution of known ion concentrations in a range where ion concentrations are proportional to peak area.

The analyses were performed with a Hewlett Packard CE instrument (model G1600AX). The 50-$\mu$m i.d. capillary used was 64.5 cm long and was filled with a buffer. The samples were filtered before their analysis using a 0.2 micrometer filter.

D) Comparison Between Analytical Methods

Figure 1A:
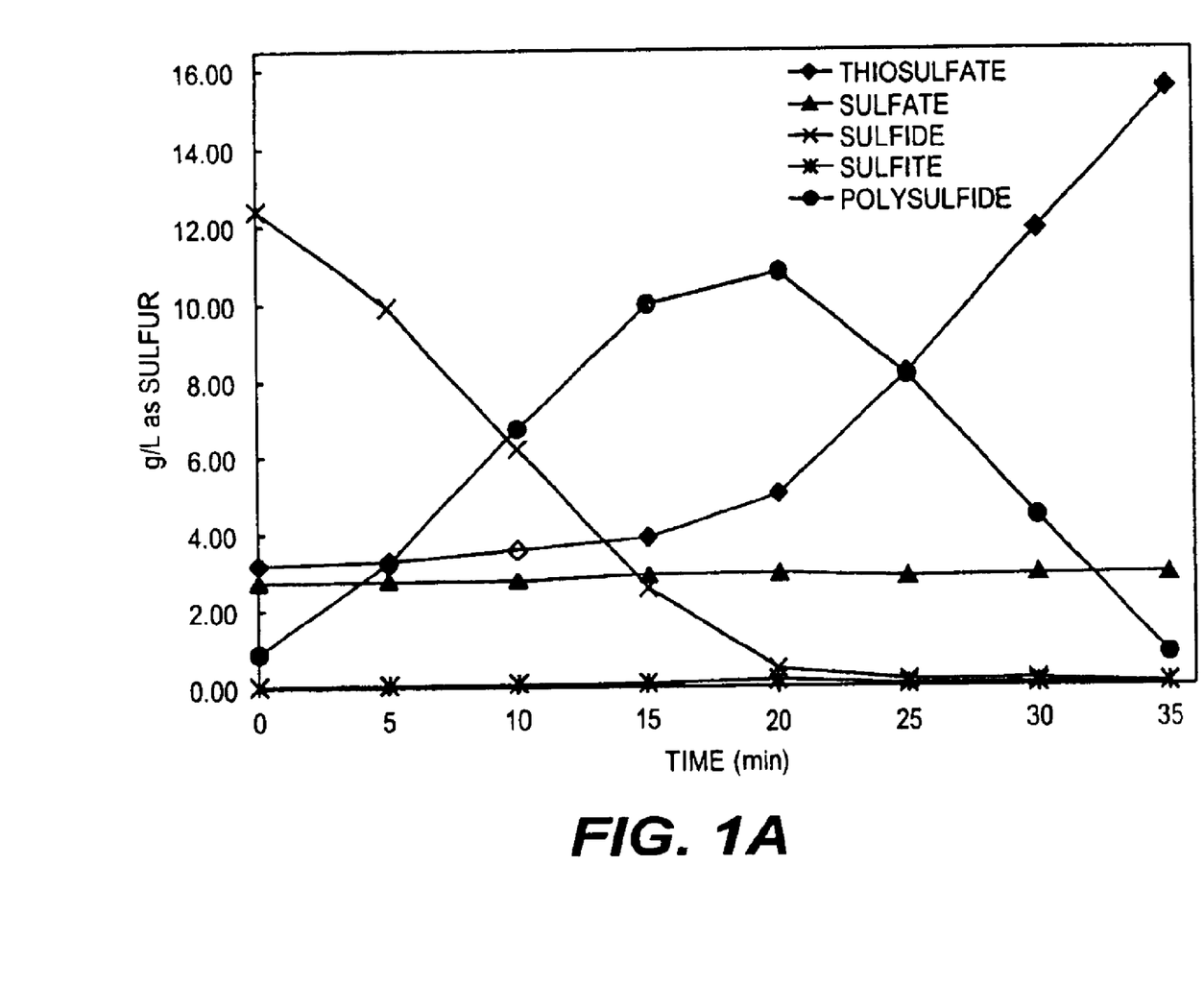
FIG. 1A is a graph representing typical results of capillary electrophoresis analysis, illustrating the separation and the analysis of all the sulfur-compounds in a sample.

By using the gravimetric method, only the polysulfide amount in the sample can be determined and this amount is expressed as polysulfide excess sulfur rather than total sulfur atom in the polysulfide ion. Capillary electrophoresis (CE) allows the separation and the analysis of all the sulfur-compounds investigated with one method, as illustrated in FIG. 1A.

Methods of Analysis Using Colorimetric Methods

A) Background Information—Color Theory

An excellent introductory reference for this material is the Kirk-Othmer Encyclopedia of Chemical Technology, Volume 6, Fourth Edition, Wiley-Interscience Publication, John Wiley & Sons, pp 841–876. There are many types of color systems that exist. The following color systems are interrelated by the following equations.

1. Different Color Co-ordinate Systems (most common systems):

a) Tristimulus Values XYZ (uses the chromacity diagram) and
b) Chromaticity Co-ordinates xyz
c) Mixed Co-ordinates Yxy $$x = \frac{X}{X+Y+Z} \quad y = \frac{Y}{X+Y+Z} \quad z = \frac{Z}{X+Y+Z}$$

d) CIELAB Co-ordinates L*a*b* (Non-Linear transformation of the 1931 CIE X,Y,Z space)

$$L^* = 116\left(\frac{Y}{Y_n}\right)^{1/3} - 16$$

$$a^* = 500\left[\left(\frac{X}{X_n}\right)^{1/3} - \left(\frac{Y}{Y_n}\right)^{1/3}\right]$$

$$b^* = 200\left[\left(\frac{Y}{Y_n}\right)^{1/3} - \left(\frac{Z}{Z_n}\right)^{1/3}\right]$$

e) CIELUV Co-ordinates L*u*v* (Preserves a property of the CIE 1931 chromacity space. This is the characteristic space; chromaticities of additive mixture of color stimuli lie on the straight line connecting the chromaticities of the component stimuli.)

$$L^* = 116\left(\frac{Y}{Y_n}\right)^{1/3} - 16 \quad u' = \frac{4X}{X+15Y+3Z}$$

$$u^* = 13L^*(u' - u'_n) \quad u'_n = \frac{4X_n}{X_n + 15Y_n + 3Z_n}$$

$$v^* = 13L^*(v' - v'_n) \quad v' = \frac{9Y}{X+15Y+3Z}$$

$$v'_n = \frac{9Y_n}{X_n + 15Y_n + 3Z_n}$$

Note that $\Delta E^*_{ab}$ and $\Delta C^*_{ab}$ are accepted parameters in terms of color difference; whereas $\Delta(ab)^*$ is an expression that we derived. There is an extensive list of other known and accepted color indicators in the following reference: Pulping and Paper production, 97/98 Technical Information Papers, TAPPI PRESS, Atlanta, Ga., pp 858–866, TIP 0804-04. All of the color indicators that pertain to liquid color measurement, and, with certain modifications, those used for measuring color of solid materials (for example, liquid solutions of polysulfides may be blotted onto a support and dried) may be employed in the present invention.

Figure 2:
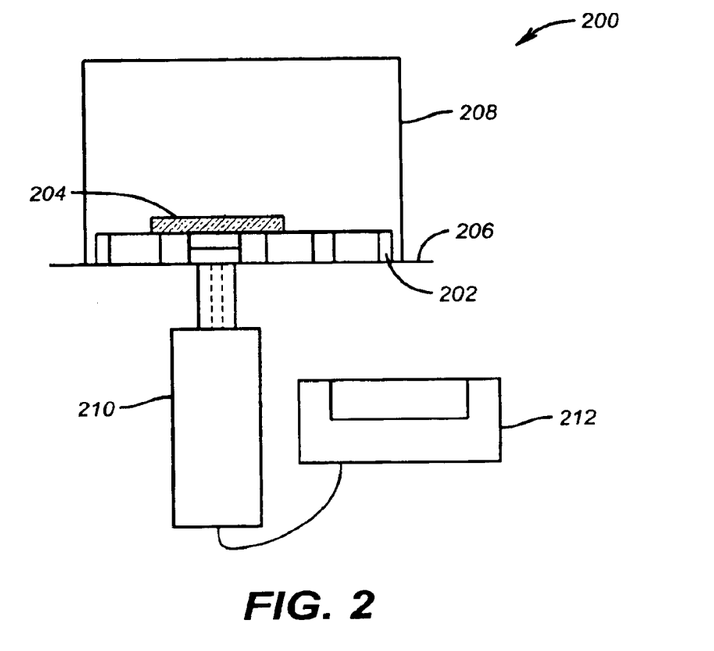
FIG. 2 is a side elevation schematic of an apparatus useful in the invention for measuring color of samples containing polysulfide using the CIE L*a*b* system.

The oxidized white liquor samples containing polysulfide were found to have a color matrix. One preferred apparatus 200, illustrated in FIG. 2, was used to determine the color of the various oxidized white liquor samples containing polysulfide. Preferred apparatus 200 comprised a cell plate 202 consisting of 12 cells, each preferably able to hold 2.8 mL sample, a white tile 204, a clear support plate 206, an opaque box cover 208 to minimize interference from ambient light, and a color measurement means 210. One suitable, preferred color measurement means is that known under the trade designation "Chroma Meter" model CR-300, available from Minolta, which was used in the present invention. Preferred apparatus 200 included a display means 212, which is included in the Minolta device.

Measurement Procedure

One can measure L*, a*, b* values by targeting in the center of the cell or off-center. It was found that this had no influence on the measurement. For convenience, it is preferred to use only the four center cells of each plate (containing a total of 12 cells). Each sample is preferably measured in a different cell, and the plate is preferably changed every four samples. If the same cell is used for two different samples, the cell is preferably thoroughly washed and dried.

In order to see if measuring samples on different cells and plates would have an effect on the results, we performed measurements on four different plates chosen randomly. For each of these plates we measured L*, a*, b* values for two different cells without any sample and for one cell containing 2.8 mL of distilled water. Results in Table 1 show that color readings do not vary when different cells and plates are used.

TABLE 1

L*, a*, b* Measurements for Empty Cells and Water

|  | L* | a* | b* |
|---|---|---|---|
| Plate 1 | | | |
| No sample Cell 1 | +51.86 | −0.27 | +2.19 |
| No sample Cell 2 | +51.87 | −0.32 | +2.24 |
| 2.8 ml of distilled water | +54.73 | −0.40 | +2.20 |
| Plate 2 | | | |
| No sample Cell 1 | +51.90 | −0.29 | +2.30 |
| No sample Cell 2 | +52.00 | −0.23 | +2.22 |
| 2.8 ml of distilled water | +54.59 | −0.37 | +2.35 |
| Plate 3 | | | |
| No sample Cell 1 | +51.75 | −0.29 | +2.31 |
| No sample Cell 2 | +52.05 | −0.33 | +2.22 |
| 2.8 ml of distilled water | +54.71 | −0.41 | +2.25 |
| Plate 4 | | | |
| No sample Cell 1 | +51.87 | −0.27 | +2.22 |
| No sample Cell 2 | +52.08 | −0.29 | +2.17 |
| 2.8 ml of distilled water | +54.61 | −0.40 | +2.20 |

To determine the effect of sodium hydroxide and sodium carbonate (which are essential components of white liquor in pulp and paper applications of the invention), color measurements were also performed for different solutions (all lacking polysulfide) and their values are shown in Table 2. When comparing those results with L*a*b* measurements for distilled water, we concluded that sodium hydroxide and sodium carbonate have no effect on color readings, at least for solutions lacking polysulfide. Moreover, the results showed that variations in the sodium hydroxide and sodium carbonate concentrations also had insignificant effects. (It has been reported that viscosity does have an effect on L*a*b* readings when polysulfide is present.)

TABLE 2

L*, a*, b* Measurements for Various Solutions

| Sample Characteristics | L* | a* | b* |
|---|---|---|---|
| White tile alone | +97.10 | +0.10 | +1.72 |
| *White liquor from a mill containing 0.11% Manganese as $MnO_2$ | +53.53 | −5.86 | +20.82 |
| Caustic solution at 88 g (NaOH)/L in the cell | +54.34 | −0.39 | +2.40 |
| Caustic solution at 120 g (NaOH)/L in the cell | +54.03 | −0.37 | +2.62 |
| Fully oxidized white liquor from a mill | +54.66 | −0.46 | +2.71 |
| Caustic solution at 80 g (NaOH)/L containing 24 g/L of sodium carbonate ($Na_2CO_3$) | +54.52 | −0.37 | +2.39 |
| Caustic solution at 80 g (NaOH)/L containing 48 g/L of sodium carbonate | 54.56 | −0.43 | +2.33 |

*Note:
Because of $MnO_2$ content in lime mud, white liquor from mill had an initial polysulfide content of 0.35 g/L (as S).

Color in Relation to Analytical Measurements for Polysulfide Determination

Various laboratory batch experiments were performed using oxygen and $MnO_2$ to oxidize white liquor and produce sodium polysulfide. During these experiments, samples were removed from the reactor, filtered, and subsequently analyzed by capillary electrophoresis for polysulfide concentration. All experiments (PS12, PS13, PS15, and PS16) were performed on unclarified white liquor. We then filtered the partially oxidized white liquor (using 0.2 um filters) containing the varying concentrations of polysulfide, before determining its L*a*b* values. These same liquor samples were analyzed for color according to the procedure described herein.

A first set of experiments (PS13, PS15, and PS16) was performed on an unclarified white liquor from a pulp and paper mill in Canada. Initial unclarified white liquor properties from this mill are given in Table 3. The white liquor analysis was determined by Econotech Services, Delta, British Columbia, Canada.

TABLE 3

White Liquor Properties (Experiments PS13, PS15, PS16)

|  |  | Mud | Liquor |
|---|---|---|---|
| Manganese as $MnO_2$ | mg/L | N/a | <2 |
| Sodium Sulfide: | | | |
| by potentiometric titration, $Na_2S$ | g/L | N/a | 45.2 |
| By ABC titration, $Na_2S$ | g/L | N/a | 41.6 |
| Sodium Hydroxide, NaOH | g/L | N/a | 92.0 |
| Sodium Carbonate, $Na_2CO_3$ | g/L | N/a | 27.1 |
| Total sulfur, S | g/L | N/a | 21.2 |
| Manganese as $MnO_2$ | % | 0.13 | N/a |
| Available (free) lime, CaO, | % | 1.10 | N/a |
| Calcium carbonate, $CaCO_3$, | % | 91.6 | N/a |

Experimental conditions for experiments PS13, PS15, and PS16 are given in Table 4.

TABLE 4

Experiments Conditions for Tests PS13, PS15, and PS16

| Experiment code | PS13 | PS15 | PS16 |
|---|---|---|---|
| Temperature (° C.) | 80 | 80 | 80 |
| Pressure (psig) | 0 | 0 | 0 |
| Mixing Speed (RPM) | 1500 | 1500 | 1500 |
| $MnO_2$ Concentration (g/L) | 1 | 1.8 | 0.5 |
| $O_2$ partial pressure in reactor (psi) | 8.4 | 8.4 | n/a |
| % Oxygen | 100 | 100 | 60 |
| $O_2$ Flow (mL/min) | Based on Demand | Based on Demand | 200 |

The properties of the white liquor used for experiment PS12 are listed in Table 5.

TABLE 5

White Liquor Properties, PS12

| Analysis | Mud | Liquor |
|---|---|---|
| Manganese as $MnO_2$, mg/L | — | <2 |
| Sodium sulfide, $Na_2S$, g/L | | |
| Potentiometric titration | — | 34.0 |
| ABC titration | — | 26.7 |
| Sodium hydroxide, NaOH, g/L | — | 88.5 |
| Sodium carbonate, $Na_2CO_3$, g/L | — | 23.9 |
| Total sulfur, S, g/L | — | 20.6 |
| Manganese as $MnO_2$, % | 0.11 | — |
| Available (free) lime, CaO, % | 1.26 | — |
| Calcium carbonate, $CaCO_3$, % | 85.10 | — |

The reactor conditions for generating the data of experiments PS12 using the apparatus of FIG. 1, were as follows:
Temperature=80° C.
Total Pressure: 1 psig
$MnO_2$ concentration: 2 g/L
Mixing speed: 1500 rpm
O 2 partial pressure: 8.4 psi The polysulfide concentration was plotted as a function of time. Also, plotted as a function of time, three color parameters, $\Delta E^*_{ab}$ (standard color difference), $\Delta(ab)^*$ (truncated version of $\Delta E^*_{ab}$), and $\Delta C^*_{ab}$ (metric chroma difference), defined as in Equations 6, 7, and 8, respectively.

$$\Delta E^*_{ab}=((L^*_s-L^*_b)^2+(a^*_s-a^*_b)^2+(b^*_s-b^*_b)^2)^{1/2} \quad \text{Equation 6}$$

$$\Delta(ab)^*=((a^*_s-a^*_b)^2+(b^*_s-b^*_b)^2)^{1/2} \quad \text{Equation 7}$$

and $$\Delta C^*_{ab}=((a^*_s)^2+(b^*_s)^2)^{1/2}-((a^*_b)^2+(b^*_b)^2)^{1/2} \quad \text{Equation 8}$$

It should be noted that the subscripts b and s refer to the white liquor (blank) and the oxidized samples, respectively. Upon data analysis, it is seen that the measured polysulfide concentration (g/L as S) can be correlated with the color measurements expressed by $\Delta E^*_{ab}$, $\Delta(ab)^*$, and $\Delta C^*_{ab}$. The data is plotted in FIGS. 3 and 4. It should be noted that other mathematical expressions (using the measured L*, a*, b* values) could also be used to correlate color and concentration as recognized in the art and will become apparent to the skilled artisan after review of this disclosure.

Figure 3:
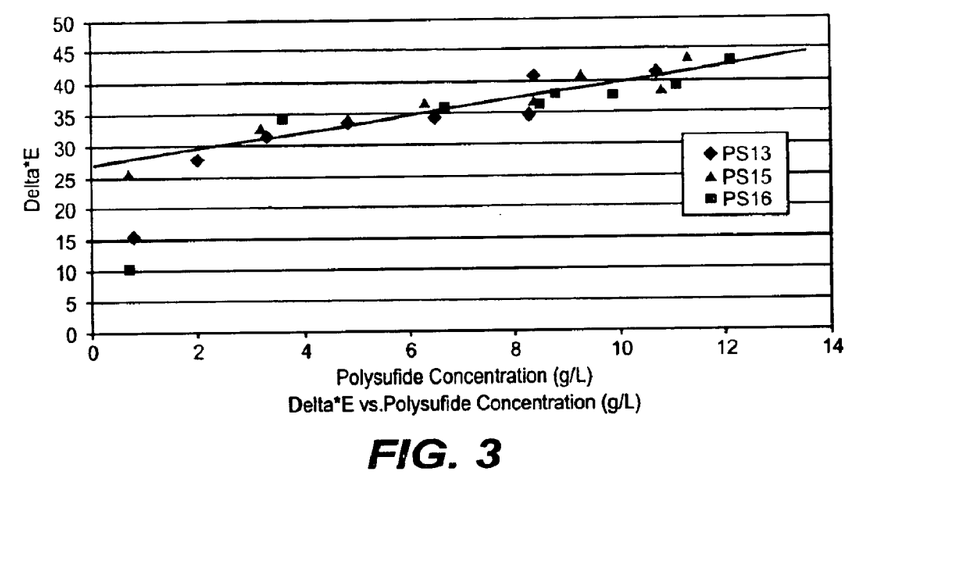
FIG. 3 is a graph representing results of color measurements versus gravimetric measurements of polysulfide for samples having polysulfide therein.
Figure 4:
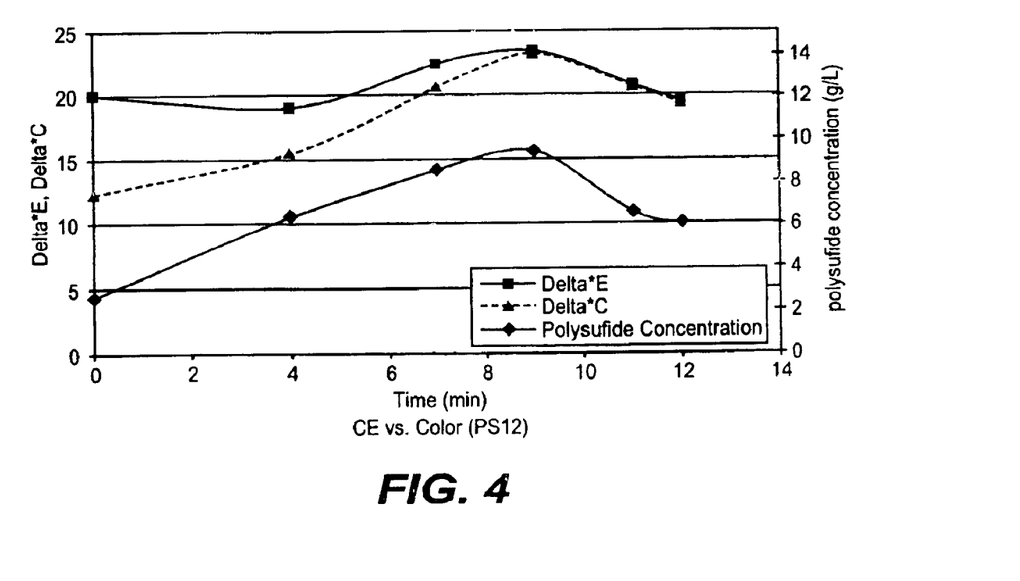
FIG. 4 is a graph comparing curves of color parameters for samples having polysulfide therein versus time with analytical measurements of polysulfide concentration versus time in the same samples.

FIG. 3 illustrates the experimental data for experiments coded as PS13, PS15, and PS16. It should be mentioned that for FIG. 3, the polysulfide concentration we have plotted was determined by gravimetry. The polysulfide concentration for experiment coded PS12 (FIG. 4) was obtained by C.E.

During these experiments, approximately 8–10 mL of oxidized white liquor were extracted from the reactor at the desired time intervals. Samples were then capped with nitrogen and quenched in an ice bath. The sampling times were 0, 4, 6, 8, 10, 12, 14 and 17 minutes. An extra sample was taken when the liquor was completely oxidized (after about 30 minutes). The first sample (t=0) corresponded to the non-oxidized white liquor. It was taken before oxygen was fed to the reactor. However, a very small portion (less than 5%) of the sulfide was oxidized by the $MnO_2$ present in the reactor. A timer was started as soon as oxygen was fed in the reactor. After being filtered with a 0.2 micrometer pore size filter, the samples were analyzed by CE and gravimetry. The volume required for these tests was about 5 mL. The rest of the samples were kept in 24 mL transparent bottles capped with nitrogen and placed in a refrigerator at 3.3° C. in order to prevent oxidation by air.

Figure 5:
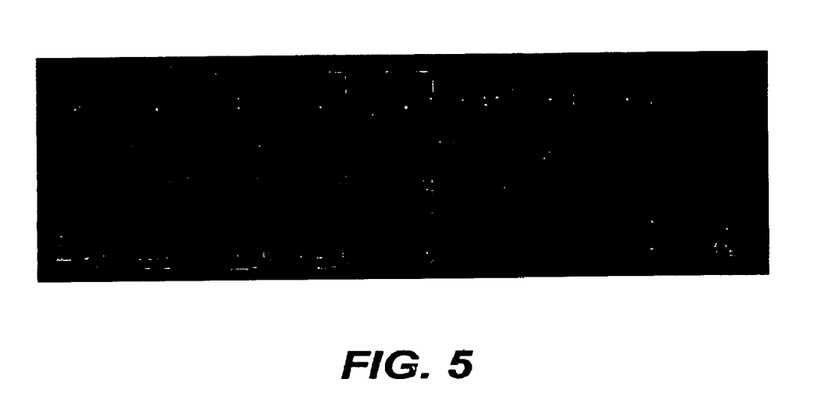
FIG. 5 is a photograph of nine samples taken at different times during production of polysulfide in accordance with the invention.

For experiment PS12 (FIG. 5) of the 9 bottles with the samples was taken with a camera known under the trade designation Kodak DC260 Zoom Camera. It is apparent that the sample color is a function of polysulfide concentration. Sample 1 (t=0) contained 0.8 g/L of polysulfide whereas sample 7 (t=14 min) contained 10.7 g/L polysilfide, which is the maximum polysulfide concentration obtained for this experiment. Sample 9 contained no polysulfide, and was totally clear and colorless. As one can see, the sample color becomes darker (darker yellow) as the polysulfide concentration is higher. These results are interesting and surprising since the nature and intensity of color observed varies with polysulfide concentration produced. The absolute maximum values for polysulfides measured tend to vary based on experimental conditions employed. The present invention enables one to monitor, and if desired, control polysulfide production methods using predetermined fixed color values.

Figure 6:
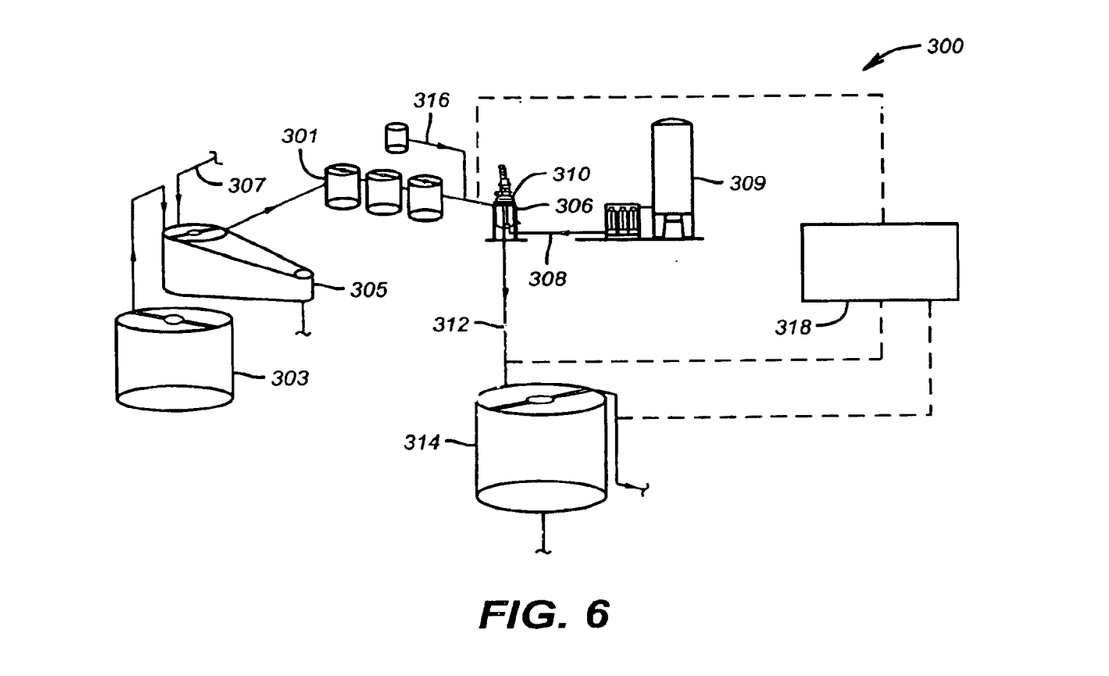
FIG. 6 is a schematic illustration of a preferred polysulfide production process and apparatus in accordance with the resent invention for use in the pulp and paper industry.

Methods of Polysulfide Preparation in a Commercial Pulp Mill Employing the Invention FIG. 6 illustrates a schematic of a preferred inventive polysulfide production apparatus and process 300 and how it would preferably be implemented in a typical causticizing plant used in the pulp and paper industry. Preferred methods utilize the existing lime mud cycle 302, 304 to recirculate the manganese dioxide, which acts as a catalyst for the production of polysulfide at high selectivity. Preferred methods employ a proprietary hollow shaft reactor 306, as previously detailed in FIG. 1, which maximizes oxygen transfer while minimizing the footprint of the equipment. A preferred reactor for this purpose is available from Robin, S A.

$MnO_2$ is introduced in the lime mud at a charge preferably ranging from about 0.5 to 2.5 g/L depending on the selectivity obtained with the particular white liquor. The more $MnO_2$, the better the selectivity, until a plateau is reached. The lime mud and white liquor from the causticizers 301 is mixed with make-up $MnO_2$, and this mixture is then introduced in the hollow shaft reactor 306. White liquor is made from green liquor, held in a green liquor tank 303, which is treated with lime in a slaker 305, which preferably has a lime make-up 307. Oxygen 308 (from a source 309, which may be a cryogenic, membrane, or adsorption unit source, or from an ozone vent gas from the bleach plant) is preferably bubbled at the bottom of reactor 306 through a perforated circular coil or equivalent means for adding oxygen. The hollow shaft mixes the gas with the white liquor while maintaining the lime mud and $MnO_2$ particles in suspension. The mixer preferably uses high intensity to maintain a large gas transfer rate so that the reaction is completed in less than 10 minutes. The selectivity of the reaction is maintained by careful control of the temperature (about 80° C.), oxygen partial pressure, and preferably both. Oxygen partial pressure control is preferably performed by maintaining a certain amount of residual inert gas through controlled purge through an opening 310. The un-clarified liquor containing polysulfide is then sent through a conduit 312 to a clarifier 314 or a pressure filter (not shown) where the lime mud and $MnO_2$ are separated and sent to a limekiln (not shown). $MnO_2$ is then recycled for reuse in reactor 306. Any loss is added through an $MnO_2$ make-up system 316. Samples for measuring one or more color parameters using a means 320 for color measurement are preferably located at various points, and one preferred sample point would be in conduit 312 to measure, and preferably control the concentration of polysulfide, and thus control its production, using a color measuring means 318.

The scope of the claims that follow is not to be limited by the description of preferred embodiments. Those skilled in the polysulfide art, after reading this disclosure, will recognize that the inventive methods are useful in a variety of applications.

What is claimed is:

1. A method of converting a sulfide in a composition to polysulfide, the method comprising the steps of:
   exposing the composition to conditions and for a time sufficient to cause conversion of at least a portion of the sulfide to polysulfide, thus forming a modified composition; and
   controlling the conversion to polysulfide by measuring a color parameter of the modified composition and correlating the polysulfide concentration in the modified composition with the resulting color measurements.

2. The method of claim 1 wherein said exposing step is selected from the group consisting of mixing of said composition, electric discharge through the composition, temperature change of the composition, and combinations thereof.

3. The method of claim 1 wherein said exposing comprises combining a gas comprising oxygen with the composition.

4. The method of claim 1 wherein said measuring a color parameter of said modified composition comprises taking samples of said modified composition at various times, measuring said color parameter with a color parameter measuring instrument, and creating a data set of time versus color for said conditions.

5. A method of combining a fluid comprising oxygen with a composition comprising sulfide during production of polysulfide in the composition, the method comprising the steps of:
   a) combining the composition with the fluid comprising oxygen under conditions sufficient for oxygen in the fluid comprising oxygen to contact at least same of the sulfide, thus forming a modified composition, and maintaining said contact for a time sufficient to cause conversion of a portion of at least some of the sulfide to polysulfide in said modified composition; and
   b) controlling the combining of said composition with said fluid comprising oxygen by measuring a color parameter of said modified composition.

6. The method of claim 5 wherein said controlling is selected from the group consisting of controlling a flow of said composition, controlling a flow of said fluid comprising oxygen, controlling mixing of said composition, controlling temperature of said composition, controlling pressure of a gaseous atmosphere above said composition, and combinations thereof.

7. The method of claim 5 wherein said color parameter is selected from the group consisting of $\Delta E^*$, $\Delta C^*$, $\Delta(ab)^*$, and other parameters derived from CIE $L^*a^*b^*$ measurements, and combinations thereof.

8. The method of claim 5 wherein the fluid comprising oxygen is selected from the group consisting of air, oxygen-enriched air, and oxygen.

9. The method of claim 5 wherein said combining comprises adding said fluid comprising oxygen to said composition.

10. The method of claim 5 wherein said conditions sufficient for oxygen in the fluid comprising oxygen to contact at least some of the sulfide comprises combining the composition with said fluid comprising oxygen in a container that is blanketed with an inert gas.

11. The method of claim 10 wherein said container comprises a means for mixing which allows contact of said oxygen, said particles, and said sulfide.

12. The method of claim 5 wherein said conversion of said portion of said sulfide to said polysulfide is carried out for a time sufficient to produce a selectivity of at least 50 percent.

13. The method of claim 5 wherein said conversion of said portion of said sulfide to said polysulfide is carried out for a time sufficient to increase yield of said polysulfide.

14. The method of claim 5 wherein said measuring a color parameter of said modified composition comprises taking samples of said modified composition at various times and measuring said color parameter with a color parameter measuring instrument, thus creating a data set of time versus color for a given flow rate of said fluid comprising oxygen, a given temperature, and a given total pressure.

15. The method of claim 5 wherein said conditions sufficient for oxygen in the fluid comprising oxygen to contact at least some of the sulfide comprises a temperature ranging from about 0° C. to about 200° C.

16. A method of controlling conversion of sodium sulfide to sodium polysulfide in a white liquor oxidation process, the method comprising:
   combining white liquor with a fluid comprising oxygen under conditions sufficient for oxygen in the fluid comprising oxygen to contact at least some sodium sulfide in the white liquor, thus forming a partially oxidized white liquor, and maintaining the contact for a time sufficient to cause conversion of a portion of the sodium sulfide, but not all of the sodium sulfide, to sodium polysulfide in the partially oxidized white liquor; and
   controlling the combining of the white liquor with the oxygen-containing fluid by measuring a color parameter of the partially oxidized white liquor and correlating the polysulfide concentration in the partially oxidized white liquor with the resulting color measurements and controlling the conversion to sodium polysulfide versus thiosulfate produced by controlling one or more parameters during said contact selected from the group consisting of temperature, flow rate of said white liquor, flow rate of said fluid comprising oxygen, concentration of oxygen in a container where said contact is taking place, mixing of said white liquor and said fluid comprising oxygen, catalyst concentration, total pressure of the partially oxidized white liquor, and combinations thereof.

17. The method of claim 16 wherein said one or more parameters is temperature of the partially oxidized white liquor.

18. The method of claim 16 wherein said color parameter is selected from the group consisting of $\Delta E^*$, $\Delta C^*$, $\Delta(ab)^*$, and other parameters derived from CIE $L^*a^*b^*$ measurements, and combinations thereof.

19. The method of claim 16 wherein the fluid comprising oxygen is selected from the group consisting of air, oxygen-enriched air, and oxygen.

20. The method of claim 16 wherein said combining comprises adding said fluid comprising oxygen to said white liquor.

21. The method of claim 16 wherein said conditions sufficient for oxygen in the fluid comprising oxygen to contact at least some of the sodium sulfide comprises combining the composition with said fluid comprising oxygen in a container that is blanketed with an inert gas.

22. The method of claim 21 wherein said container comprises a means for mixing which allows contact of said oxygen, particles, and said sodium sulfide.

23. The method of claim 16 wherein said conversion of said portion of said sodium sulfide to said sodium polysulfide is carried out for a time sufficient to produce a selectivity of at least 50 percent.

24. The method of claim 16 wherein said conversion of said portion of said sodium sulfide to said sodium polysulfide is carried out for a time sufficient to increase yield of said sodium polysulfide.

25. The method of claim 16 wherein said measuring a color parameter of said partially oxidized white liquor comprises taking samples of said partially oxidized white liquor at various times and measuring said color parameter with a color parameter measuring instrument, thus creating a data set of time versus color for a given flow rate of said fluid comprising oxygen, a given temperature, end a given total pressure.

26. A method of converting a polysulfide in a composition to sulfide, the method comprising the steps of:

exposing the composition to conditions and for a time sufficient to cause conversion of at least a portion of the polysulfide to sulfide, thus forming a modified composition; and controlling the conversion to sulfide by measuring a color parameter of the modified composition and correlating the polysulfide concentration in the modified composition with the resulting color measurements.

27. The method of claim 26 wherein said exposing step is selected from the group consisting of mixing of said composition, temperature change of the composition, and combinations thereof.

28. The method of claim 26 wherein said measuring a color parameter of said modified composition comprises taking samples of said modified composition at various times, measuring said color parameter with a color parameter measuring instrument, and creating a data set of time versus color for said conditions.

* * * * *